United States Patent [19]

Dexter et al.

[11] Patent Number: 4,785,055

[45] Date of Patent: Nov. 15, 1988

[54] PROCESS FOR THE PREPARATION OF N-HALOAMIDE POLYMERS

[75] Inventors: Robin W. Dexter, Wilton; Peter A. Jarovitzky, Thomaston; Yun-Lung Fu, Milford, all of Conn.

[73] Assignee: American Cyanamid Company, Stamford, Conn.

[21] Appl. No.: 65,442

[22] Filed: Jun. 23, 1987

Related U.S. Application Data

[63] Continuation-in-part of Ser. No. 859,681, May 1, 1986.

[51] Int. Cl.$^4$ ................................................ C08F 8/22
[52] U.S. Cl. .................... 525/356; 525/329.4; 525/359.3; 162/164.6; 526/292.2; 526/292.95
[58] Field of Search ............................ 525/356, 359.3; 526/292.2, 292.95

[56] References Cited

U.S. PATENT DOCUMENTS

| | | | |
|---|---|---|---|
| 2,533,166 | 1/1948 | Jones | 526/292.95 |
| 3,039,529 | 6/1962 | McKennon | 525/329.4 |
| 3,686,306 | 8/1972 | Hoke | 526/292.95 |
| 4,075,183 | 2/1978 | Kawakami et al. | 526/292.2 |
| 4,090,992 | 5/1978 | Scanley | 524/555 |
| 4,147,681 | 4/1979 | Lim et al. | 526/292.95 |
| 4,301,257 | 11/1981 | Zengel et al. | 525/329.4 |
| 4,356,289 | 10/1982 | Zengel et al. | 525/358 |
| 4,357,447 | 11/1982 | Zengel et al. | 526/292.95 |

Primary Examiner—Joseph L. Schofer
Assistant Examiner—Bernard Lipman
Attorney, Agent, or Firm—Frank M. Van Riet; Michael J. Kelly

[57] ABSTRACT

Aqueous solutions of polyacrylamides are acidified and then reacted with halogen gas or hypohalites to provide N-halogenated polymers. The product of the process are good wet strength additives for paper made from aqueous pulps of paper making fibers.

11 Claims, No Drawings

PROCESS FOR THE PREPARATION OF N-HALOAMIDE POLYMERS

CROSS-REFERENCE TO RELATED APPLICATION

This application is a continuation-in-part of copending application Ser. No. 859,681, filed May 1, 1986.

FIELD OF THE INVENTION

The present invention relates to an improved process to produce N-haloamide polymers and copolymers. More particularly, it is concerned with the N-halogenation of acrylamide polymers and copolymers in acidic media using halogen gas or hypohalites.

BACKGROUND OF THE INVENTION

The use of polymeric materials in the treatment of paper making fibers to improve strength is known. In the commonly assigned copending application, above-identified, for example, novel high molecular weight N-chloroamide polymers and copolymers and a process for their production by chlorination of a water-in-oil emulsions of the high molecular weight polymers are claimed.

Among the prior art polymers are the amino-aliphatic polymers set forth in U.S. Pat. No. 2,729,560 which discloses the hypochlorite treatment of acrylamide polymers whereby 20–80% of the amide groups are converted to amino groups. U.S. Pat. No. 2,890,978, on the other hand, discloses a similar hypochlorite process wherein less than 15% of the amide groups are degraded to amino groups and dry strength is imparted to paper upon application of the polymer produced. Both of these patents teach the addition of these polymers, which are the final degradation products of the Hoffmann reaction of acrylamide polymers with hypochlorite or chlorine under alkaline conditions. N-chlorinated high polymers are not obtained under such conditions.

U.S. Pat. No. 3,929,744 discloses the reaction of a sterically hindered amide polymer with a hypochlorite to produce an isocyanate functional polymer useful as a coating composition after crosslinking with a polyol or polyamine. U.S. Pat. No. 4,301,257 teaches a similar polymer produced by reacting a low molecular weight chlorinated acrylamide polymer with a tertiary amine having a pKa value of over 7 in an inert solvent. 20–100% of the amide groups of the chrge polymer are said to be converted to isocyanate groups. The maximum molecular weight of the polymer is said to be about 10,000. Again, N-chlorinated high polymers are not obtained.

Processes of making polyfunctional N-chloroamide derivatives of acrylamide homo and copolymers are taught by U.S. Pat. Nos. 4,356,289 and 4,357,447 wherein chlorine in a dilute aqueous suspension of a mineral acid at 0°–40° C. is employed. German Pat. No. 2,931,572 also teaches such a chlorination process. In contrast to the water soluble products produced herein, the products of these citations are not water soluble, which would not make them useful in making paper.

Belgian Pat. No. 878,978 is similar to U.S. 4,301,257, discussed above, wherein amide-containing acrylic polymers are chlorinated and rearranged to isocyanate groups in the presence of tertiary amines. The polymers are also of very low molecular weight, and are not N-halogenated.

Japanese Patent Sho No. 57-158,203 (82-158,203) discloses the reaction of polyacrylamide with a hypochlorite salt (or Cl$_2$ and alkali) to provide isocyanate groups, then further reacted with a diamine to provide amino group-containing polymers useful for paper strengthening. These are not N-halo high molecular weight polyacrylamides.

Hahn et al. Angew, Makromol, Chem., 50, (1), 53–65, (1976) teaches the chlorination of polyacryl amides with HOCl, Me$_3$COCl and Cl$_2$O to provide chlorinated secondary amides wherein the recurring unit in the polymer is

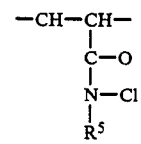

R$^5$ being alkyl or aryl. They differ from the compounds of interest, especially in that they lack an -NH-group.

Water-in-oil polyacrylamide emulsions are chlorinated in U.S. Pat. No. 4,090,992 by contacting said emulsions, containing less than 40% of water, with chlorine gas at −20° C. In a specific example, the emulsion is first dried and then contacted with chlorine gas, to avoid congulation or agglomeration. The mixture is then warmed and caustic soda is added. This results in the formation of an amino group containing polymer.

In the above-mentioned copending application, Ser. No. 859,681, it is disclosed that the chlorination of an acrylamide polymer in an emulsion can be accomplished without prior dehydration and is, in fact, more rapid than under dry conditions. The presence of water is postulated to be a necessary adjunct to the chlorination reaction. It has now been found possible, and is the subject matter of this invention, to halogenate in acidic solution either with halogen gas or a hypohalite. The formation of the N-haloacrylamide polymer is very rapid without degradation to amine, and it is not necessary to prepare and use emulsions. The products of the process are water soluble solutions of the polymers, and they can be used directly in the papermaking process.

It is accordingly, a principal object of the present invention to provide a process for the N-halogenation of polyacrylamides to produce N-halogenated polymers and to use them to impart wet strength to paper, paperboard and other fibrous products.

The chlorination process of this invention can be carried out on site at paper mills, thereby avoiding the storage and handling of chlorinated emulsions or solutions which are corrosive and unstable over a long period.

SUMMARY OF THE INVENTION

In accordance with the present invention, there is provided a process for the halogenation of a water soluble acrylamide polymer, the process comprising contacting an aqueous solution of the polymer, preferably one having a molecular weight of at least about 100,000, with a reagent selected from a halogen gas or a hypohalite at a temperature ranging from about −10° C. to about 80° C., at a pH of below about 6.0, preferably below about 2.0, for a time from practically instantaneously, e.g., much less than about 5 minutes to about 6 hours and at a mole ratio of halogen gas or hypohalite to polymer ranging from about 0.1:99.90 to about 50:50, respectively, to thereby form the corresponding water-soluble, N-halogenated polymer.

Also contemplated by the invention is a process as above defined including the steps of adding the product of the process to papermaking pulp in an amount to provide from about 0.1 to about 5 percent by weight of N-halogenated polymer based on the dry weight of the fibers in the papermaking pulp and forming the fibers into a paper sheet.

The polymers produced by the process are water-soluble, and do not break down when present in emulsion form. They prove to be excellent wet-strength agents, especially at molecular weights above 50,000, when combined with fibers and formed into paper. The paper produced by the process exhibits increased dry strength also.

These polymers can be added to water suspensions of hydrated or unhydrated or other paper-making fiber pulp, preferably celluosic fiber pulp, in the beater, stock chest, head box or at any other suitable point ahead of the paper-forming step in papermaking machinery. Alternatively, the polymers can be applied to the fibers of preformed paper as an aqueous spray or as a tub size, either alone or in admixture with other impregnating agents.

DETAILED DESCRIPTION OF THE INVENTION

The term "paper" is meant to include any fiber containing mat or web. The fiber may be cellulosic fiber, which is preferred, glass fiber, polyamide fiber, viscose fiber, mixtures of any of the foregoing, and the like. Examples include fabrics, felts, boards, shaped articles, and the like.

The polymer products are selectively absorbed by the fibers from a dilute aqueous solutions thereof containing such fibers in amounts much greater than those corresponding to the concentration of polymer in the solution or to what would be contained in the water normally left in the sheet after forming. This permits the application to fibers of sufficient quantities of the wet strength imparting polymer to produce the desired degree of wet strength while the fibers are in dilute aqueous suspensions of the consistency ordinarily used in paper mills, which is about 0.1-6% or, in special processes, at higher consistencies.

The N-haloamide chain polymers produced by the present process can be made from a wide variety of polymers providing the polymer is water soluble, does not precipitate after halogenation and contains primary amide groups. A number of polymers and copolymers of this type are well known, and may be used as raw materials. However, the preferred materials are polymers of acrylamide, polymers of lower alkyl-substituted acrylamides such as polymethacrylamide and polyethylacrylamide and copolymers of these acrylamides with other polymerizable monomers which result in the production of water-soluble polymers.

Such starting materials are known to exist in the form of both lower molecular weight polymers and relatively high molecular weight polymers, and either form may be used in practicing the present invention. It is known, for example, that polyacrylamides of controlled molecular weights can be obtained by polymerizing acrylamide in water containing approximately 5 to 40% by volume of a water-miscible alcohol such as ethanol or isopropanol. By this procedure polymers having molecular weights as low as 2,000 or as high as 300,000 can be prepared. Similar procedures may be used in preparing the copolymers described above and the resulting molecular weights of the products are comparable, i.e. ranging from about 2,000 to about 40,000 in the low polymers and from 50,000 to 500,000 or more in the higher polymers. It is also known that polyacrylamides or the copolymers described above having molecular weights as high as 10,000,000 can be prepared by procedures known as inverse emulsion polymerization. As will subsequently be illustrated, polymers and copolymers of either class may be used with the formation of the corresponding N-chloroamide chain polymers of the present invention.

According to process of the present invention, the N-haloamide polymers are produced by converting part of the carboxylic acid amide groups of linear carbon chain polymers of the above types into N-haloamide groups by the action of, among others, chlorine or bromine or a hypochlorite or hypobromite in an aqueous solution. This conversion of amide groups into N-haloamide groups is known and it has long been applied to substantially non-polymerized compounds. By employing the reaction conditions hereinafter described, a proportion of the amide groups of polyacrylamides and acrylamide copolymers are converted into N-haloamide groups with the formation of the desired resinous products.

The N-haloamide polymers provided in accordance with the present invention have molecular weights, based upon their intrinisic viscosity, of at least about 2,000. However, polymers useful for combining with fibers aand forming into paper have molecular weights, preferably above about 50,000 and especially above about 100,000. In any event, all such polymers, including the lower molecular weight polymers, are broadly useful, for example, as binders, and as aqueous based crosslinking agents for textiles, coatings, and the like.

Specifically, the products or the present process are polymers, copolymers terpolymers, etc., which contain N-haloamide groups. They correspond substantially to the formula:

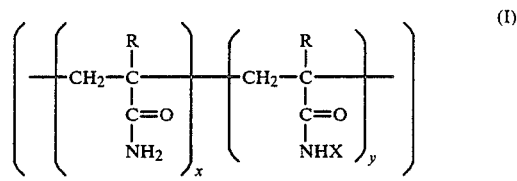

in which R is hydrogen or methyl, the ratio x to y is from about 99.9:0.1 to about 50:50, respectively, preferably about 2 to 85:15, same basis, X is a halogen and the molecular weight is at least 100,000.

The novel reaction products of cationic acrylamide co-polymers correspond substantially to the formula:

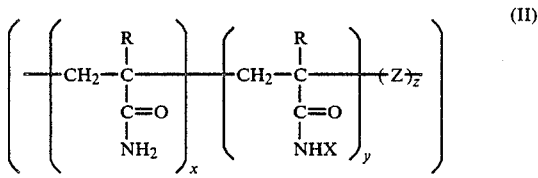

in which R, X and the ratio of x to y are as defined above, the ratio of (x plus y) to z ranges from about 99.9:0.1 to about 50:50, respectively, preferably about 95:5 to about 85:15, Z constitutes the polymerization residue of a cationic monomer copolymerizable with an acrylamide.

Alternatively, component x of Formulae I or II may be replaced by a non-ionic monomer as long as the resultant polymer is water-soluble. This is to say, component x of Formulae I or II may be substituted by a non-ionic monomer such as those enumerated below, e.g., N-vinyl pyrrolidone. Preferably, the polymer contains from about 1–20%, by weight, of the component x which may be replaced by the non-ionic monomer. Such polymers are produced by charging a starting copolymer of the nonionic monomer and an acrylamide (or including a monomer Z) to the process described below.

Some examples of useful cationic monomers and the corresponding structure of Z are illustrated in the following table:

| Cationic Monomer | (Z) |
|---|---|
| H₂C=CH  CH=CH₂ \ H₂C  CH₂ Cl⁻ \ N⊕ / H₃C  CH₃ (DADM) | [−CH₂−CH  CH−CH₂−] \ H₂C  CH₂ Cl⁻ \ N⊕ / H₃C  CH₃ |
| CH₂=C(CH₃)−C(=O)−NH−(CH₂)₃−N⊕(CH₃)₃ Cl⁻ (MAPTAC) | [−CH₂−C(CH₃)−C(=O)−NH−(CH₂)₃−N⊕(CH₃)₃ Cl⁻] |
| CH₂=C(CH₃)−C(=O)−O−(CH₂)₂−⊕N(CH₃)₃ CH₃OSO₃⁻ (Q5) | [−CH₂−C(CH₃)−C(=O)−O−(CH₂)₂−⊕N(CH₃)₃ CH₃OSO₃⁻] |
| CH₂=C(R)−C(=O)−O−CH₂−CH₂ Cl⁻−⊕N(CH₃)₃ (R = H: Q—DMAEA Methyl chloride) (Q9) (R = CH₃: Q—DMAEM Methyl chloride) (Q6) | [−CH₂−C(R)−C(=O)−O−CH₂−CH₂ Cl⁻−⊕N(CH₃)₃] |

Z may also be introduced into the products by the modification of the polymers before or after the halogenation so that is makes the products cationic. (For example, a cationic polymer may be prepared by the Mannich reaction on a polyacrylamide, and then Mannich polyacrylamide may be halogenated to produce the cationic N-haloamide polymer. In this case —Z— is

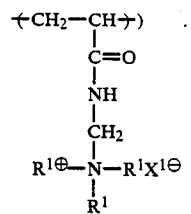

$R^1$ may be $CH_3$, $C_2H_5$, etc.

$X^1$ may be $CH_3OSO_3^-$, etc.

Other cationic monomers known to those skilled in the art may also be used, i.e., any such monomer copolymerizable with an acrylamide.

In the production of the N-haloamide polymers by this invention, any polymer, including neutral, cationic, natural or synthetic polymers which contain carboxylic acid amide groups, and preferably linear aliphatic chain polymers and coplymers wherein carboxylic acid amide groups are attached to carbon atoms of the polymer-forming chain, are reacted with any halogen, and preferably chlorine, or hypohalite, preferably hypochlorite, at a temperature ranging from about −10° C. to 80° C., preferably 0° C. to 40° C. In carrying out the reaction, the polymer or copolymer is introduced in the reaction vessel in the form of a solution in water.

Before the addition of the halogen, it is essential to make sure that the reaction mixture is slightly acidic. This ensures that the product does not degrade by the Hoffmann reaction into an amine which is much less effective as a papermaking additive. When the reaction mixture is alkaline, the pH level of the reaction mixture should be adjusted to about pH 6 or, preferably below, e.g., below 3.5 and especially below 2.0. This can be accomplished by adding a buffer solution or an aqueous mineral acid. Suitable aqueous mineral acids include dilute aqueous hydrochloric acid, sulfuric acid, phosphoric acid, etc. It is preferable to use dilute hydrochloric acid or sulfuric acid. The desired amount of halogen is then introduced into the reaction mixture in the form of a halogen gas or a hypohalite, such as chlorine or sodium hypochlorite. Halogenation proceeds exothermally and the reaction is carried out for a period of from practically instantaneously to about 6 hours, preferably while stirring and maintaining the reaction temperature within the range of about −10° C. to about 80° C. The reaction can be carried out either in the presence of light or in the dark. The use of temperatures higher than out 40° C. or the use of reaction time more than about 1 hour are not particularly desired because quantities of carboxyl groups may be formed by hydrolysis. The amount of halogen that is present is carefully controlledto yield the desired products. The amount of the halogen that is added to the reaction mixture is calculated by the number of recuring mer-moles of carboxylic acid amide groups present in said polymer or copolymer. The mole ratio of halogen, as above calculated, to said polymer or copolymer will be present in an amount varying from about 0.1:99.9 to about 50:50, respectively. It is preferred, however, that the molar ratio be within the range of from about 1:99 to about 20:80, respectively. Halogenation is carried out at ambient or at elevated pressures. The required reaction time decreases 15 with increasing pressure, but, for reasons for economy, the preferred pressure should range from about 1 to about 6 atmospheres gauge pressure. During the halogenation process proper mixing of the reaction mixture is preferred. The reaction mixture is diluted, at least to such an extent that 20 it can be stirred, or mixed by some other means, without any difficulty. When the above conditions are maintained, halogenation is completed in the range of from practically instantaneously to about 6 hours, preferably from about 10 minutes to about 2 hours.

Depending on the amount of halogen used in the reaction, the composition of polymers or copolymers and the reaction conditions, the carboxylic acid amide groups can be transformed into N-haloamide groups varying in the range from about 1% to about 100%, preferably about 5–20%. The content of N-haloamide group can be determined by and "active halogen titration" method.

N-halogenation under this invention can be achieved by a batch or continous means.

In one manner of proceeding, a solution of the primary amide-containing backbone polymer is stirred rapidly in a reaction vessel, preferably glass-lined or chlorine-resistant plastic, such as SYLGEF® Cl-R. Chlorine gas is bubbled into the polymer solution at a temperature above the freezing point of the solution to about 40° C.; preferably at the low temperature, until sufficient gas has been added. The reaction of the chlorine with the amide to form N-haloamide groups also forms hydrochloric acid, in equal amounts. This acid lowers the pH of the solution, e.g., from 6.0 to 2.0 and stabilizes the product to hydrolysis. Under these preferred conditions, the reaction is rapid and is complete as soon as the chlorine is added. Analysis of the polymer (by liberation of iodine from acidified potassium iodide, and titration of the iodine with thiosulfate) indicates that the reaction of the chlorine is almost quantitative.

In another manner of proceeding, N-halogenation may be carried out with sodium hypochlorite solution, provided that sufficient acid is added to the polyacrylamide solution before addition of the sodium hypochlorite to ensure that the alkalinity of the hypochlorite is neutralized, and the pH of the solution of polymer is always acidic. The amount of acid required is, therefore, directly dependent upon the amount of sodium hypochlorite it is desired to add, i.e., on the extent of N-halogenation. For a polyacrylamide with a 5% Cl content desired, the level of sulfuric acid (100% basis) is approximately 10 wt. % of the polymer. Under these preferred conditions also, the rate of the reaction is virtually immediate at pH values of 2 and below. Above pH 2 and up to pH 6 the reaction is progressively slower, and can sometimes be complicated by side-reactions (hydrolysis) which can be deleterious to the product performance. The practical pH range for the reaction is below pH 6, preferably below pH 3.5 and especially prepared below about 2.0.

The foregoing methods are batch processes. It is possible also to carry out the reaction with halogen gas or sodium hypochlorite with acid on a continuous basis. This is invaluable for application of the products, when they are made on-site at its point of use.

In one continous procedure, the in-line chlorination of a polyacrylamide solution can be accomplished as follows: chlorine gas is metered into a line through which is pumped a solution of polyacrylamide. The gas inlet is located at a point of high shear and is followed by a zone of mixing, e.g., by an efficient static mixer, or by a positive action mixer, to ensure that the chlorine gas does not locally over-chlorinate the polymer. The effluent polymer solution is thereby N-chlorinated and can be used immediately. Units for the metering of chlorine gas are available commercially.

In another method, there can be used the in-line chlorination of water, which is then used to dilute the polymer solution (in-line or batch). To do this, chlorine gas is metered into a continous stream of water to provide chlorine-water which is used to dilute either a continous stream of the polyacrylamide solution or in a batch reactor. In either case, it is essential to have good mixing, to ensure that the chlorine distribution is even. The product can be used directly in papermaking.

In a third continous method, there can be used the in-line addition of acid followed by hypochlorite solution. To do this, polyacrylamide solution flowing through a line is acidified and subsequently a solution of a hypochlorite is metered in at a point of good mixing. Provided that the pH of the solution after the addition of hypohalite is less than about pH 2, the solution can be used directly in papermaking.

The process of isolating the product depends on several factors. These factors include the composition of the polymers or copolymers, the range of the conversion of carboxylic acid amide groups to N-haloamide groups, and the physical form of the reaction mixture. In general, when the conversion of the carboxylic acid amide groups to N-haloamide is high, i.e. above about 50%, the reaction product precipitates from reaction solution during or after the completion of the halogenation reaction. The product can thus be separated from the reaction mixture by conventional means, for example, by filtering or cetrifuging. The more highly chlorinated polymers are soluble in dimethyl sulfoxide. In case the product is soluble in the reaction mixture after completion of halogenation, the product can be separated from the reaction mixture by the conventionally known technique of precipitation, that is, by the addition of a water-soluble organic solvent, such as for example, methanol, ethanol, propanol, etc., to the reaction mixture, or by precipitating the product by pouring the reaction mixture into a water-soluble organic solvent, as mentioned above. The amount of the water-soluble organic solvent used for the precipitation generally ranges between an amount about equal to the reaction mixture to an amount about ten times the volume of the reaction mixture. Although the product can be separated from the reaction mixture by the various means decribed above, it is not always necessary to separate the product from the reaction mixture, i.e. the reaction mixture can be used directly as produced.

The polymers produced by the process of the invention are water-soluble, and they may be produced from copolymers of an acrylamide with cationic monomers, or terpolymers of an acrylamide and other non-ionic or cationic monomers as discussed above. The non-ionic comonomers may be selected from the group comprising methacrylamine, N-methylacrylamide, N,N-dimethylacrylamide, acrylonitrile, N-vinyl pyrrolidone, ethyl acrylate, vinyl acetate, methyl (meth) acrylate and the like. Other non-ionic comonomers which are known to those skilled in the art to be capable of free radical polymerization are also meant to be included as useful in this invention. The preferred water-soluble polymers, prior to halogenation, are those polymers with the cationically charged monomers listed above, i.e. MAPTAC (methacrylamidopropyl trimethyl ammonium chloride), DADM (diallyladimethyl ammonium chloride), DMAPMA (dimethylaminopropyl methacrylamide) DMAEM (dimethylamino ethyl methacrylate), DMAEA (dimethylaminoethyl acrylate) and their quaternary salts. As with the non-ionic monomers, other cationic monomers which are known to those skilled in the art and are capable of free-radical polymerization may also be used and are meant to be included in this invention.

DESCRIPTION OF THE PREFERRED EMBODIMENTS

The following examples are set forth for purposes of illustration only and are not intended to limit the present invention except as set forth in the appended claims. All parts and percentages are by weight unless otherwise specified.

As used herein monomers (copolymerized with acrylamide) are abbreviated as follows:

| | |
|---|---|
| AMD | Acrylamide |
| SA/AA | Sodium Acrylate/Acrylic Acid |
| NNDMAND | N,N—dimethylacrylamide |
| MAMD | Methacrylamide |
| AAPSA | Acrylamidopropane Sulfonic Acid |
| DADM | Diallyldimethylammonium chloride |
| Q5 | Dimethylaminoethyl methacrylate methosulfate quaternary salt. |
| Q6 | Dimethylaminoethyl methacrylate methylchloride quaternary salt. |
| Q9 | Dimethylaminoethyl acrylate methyl chloride quaternary salt |
| MAPTAC | methacrylamidopropyltrimethyl ammonium chloride |

The amide level present in the polymer can vary from 1-99%. N-halogenation of the amide may be total or partial.

The term "standard viscosity", as used herein, means the viscosity of a 0.1% solution of the polymer in 1M NaCl in centipoises measured on a Brookfield Viscometer with UL adapter, speed 6 rpm, 25° C.

EXAMPLE 1

To a suitable reaction vessel are charged 250 parts of a 10% aqueous polyacrylamide solution (approximate molecular weight: 267,000). This solution, pH 5.0, is diluted by adding 250 parts of water and then cooled to 0° C. Chlorine gas is charged into the solution with stirring for minutes at the rate of 39.33 ml of chlorine gas per minute. (A total of 10 mole % of chlorine gas is charged). During the charge of the chlorine gas, the reaction vessel is immersed in an ice-water bath in order to keep the reaction temperature at about 0° C. After the completion of the addition of the chlorine, the reaction solution is poured slowly with stirring into 3,000 parts of methanol. The precipitated product is collected. The polymer contains 10 mole % of N-chloroamide functional groups and is soluble in water.

EXAMPLES 2-7

An 1% aqueous solution is prepared by dissolving 30 parts of a high molecular weight solid copolymer of poly-(acrylamide MAPTAC) (molar ratio of acrylamide to MAPTAC is 90:10) in 2970 parts of water. The solution is sheared in a Waring blender to give a polymer of standard viscosity of 1.95 cps. To prepare N-chlorinated polymers with different N-chloro contents, 500 parts of the above solution, pH 3.0, is used in each preparation. Thus, 500 parts of the solution is chlorinated by addition of chlorine gas at 25° with stirring. For each chlorination, the rate of the addition of chlorine gas is so adjusted that the chlorination is completed in 5 minutes. The temperature of the reaction solution is kept below 30° C.

The N-chloro content of each resin solution is analyzed by the active chlorine determination method. The mole % of N-chlorinated acrylamide unit for each resin is shown in Table 1:

TABLE 1

| Chlorinated Copolymers of AMD/MAPTAC | |
|---|---|
| Polymer of Example | Mole % N—Chloroacrylamide Units |
| 2 | 3.1 |
| 3 | 6.3 |
| 4 | 11.5 |
| 5 | 15.4 |
| 6 | 30 |
| 7 | 8.3 |

EXAMPLES 8-12

A 1% aqueous solution is prepared by dissolving 95 parts of a high molecular weight emulsion containing 32.51% active solid of a copolymer of acrylamide and Q5 (the mole ratio of acrylamide to Q5 is 90:10) in a mixture of 1.7 parts of a commercially available emulsion breaker and 2991.75 parts of water. The solution, pH 3.0, is sheared in a Waring blender to give a polymer of standard viscosity of 1.8 cps. The process for Examples 2-7 is repeated. The polymers prepared and the mole % of N-chlorinated acrylamide unit for the resins are listed in Table 2.

TABLE 2

| Chlorinated Copolymers of AMD/MAPTAC | |
|---|---|
| Example | Mole % N—Chloroacrylamide Units |
| 8 | 3.5 |
| 9 | 6 |
| 10 | 11.5 |
| 11 | 17.4 |
| 12 | 31 |

EXAMPLE 13

Two grams of a copolymer of 90 mole % of acrylamide and 10 mole % of dimethylaminoethyl methacrylate methylchloride quaternary salt (Q6) dissolved in water to a total of 200 g of solution in a jar sealed with a rubber septum is stirred magnetically. Sixty four mls of pure chlorine gas at 1 atmosphere pressure is then injected through the system into the stirred solution, pH 3.0 over a period of 10 seconds. The N-chlorinated solution is employed as a wet strength additive by adding to bleach Kraft pulp at ph 7.0 at a dosage of 0.5% based on the fiber weight, the immediate wet tensile strength is 3.3 lbs./in.

EXAMPLES 14-18

A fixed quantity of sodium hypochlorite solution is added to a series of identical aqueous solutions of a polyacrylamide of 1.0% polymer content, acidified with various amounts of sulfuric acid, so that the final pH of the N-chlorinated polymers varies between pH 1.8 and pH 6. The temperature of each sample is 23° C.

Portions of each solution are withdrawn at intervals of time after the hypochlorite addition, and tested as wet strength resins by adding to 0.6% bleached Kraft pulp at pH 7. The resin comprises 10 mole % Q-6/90 mole % AMD. The molecular weight is about 250,000. The dosage is 0.05% on fiber. The pH of the paper pulp is 7.0. Without additive, the wet tensile of the papers is 0.50 lb/in. The results are as follows:

| Example | Elasped Time (minutes) | Temp. (°C.) | Immediate Wet Tensile Strength (lbs/in) pH of reaction | | | | |
|---|---|---|---|---|---|---|---|
| | | | 1.8 | 3.5 | 4.0 | 4.9 | 6.0 |
| 14 | 0.083 | 23 | 3.6 | 2.7 | 1.9 | 1.0 | 0.8 |
| 15 | 5 | 23 | 3.8 | 3.3 | 2.8 | 1.8 | 1.4 |
| 16 | 60 | 23 | — | 3.6 | 3.5 | 2.9 | 1.7 |
| 17 | 375 | 23 | 3.6 | 3.2 | 3.0 | 2.4 | 1.6 |
| 18 | 1440 | 23 | — | — | — | 2.2 | 1.5 |

The beneficial effects of chlorination with acid hypochlorite, followed by treating the pulp are thus demonstrable, even in very short reactive times. Low pH's are seen to be very beneficial.

EXAMPLE 19-22

Following the procedure of Example 14–18 but chlorinating at a temperature of 0° C. and then making paper, the following results are obtained:

| Example | Elapsed Time (minutes) | Temp (°C.) | Immediate Wet Tensile Strength (lb/in) pH of reaction | | |
|---|---|---|---|---|---|
| | | | 2.2 | 3.8 | 5.1 |
| 19 | 0.083 | 0 | 3.4 | 1.2 | 0.8 |
| 20 | 5 | 0 | 3.3 | 2.0 | 1.0 |
| 21 | 60 | 0 | 3.5 | 2.6 | 2.1 |
| 22 | 360 | 0 | 3.4 | 3.1 | 2.9 |

Again, the beneficial results are demonstrated, and the process is especially efficient at low pH values.

The following examples demonstrate the use polyacrylamide or copolymers of acrylamide from a wide variety of sources, having a wide range of compositions and molecular weights.

PROCEDURES A-R

Acrylamide and the appropriate comonomer(s) are dissolved in water, to provide a solution at 15% monomer content and adjusted to pH 3. Chain transfer agent hypophosphite, and initiator, 1000 ppm of 2, 2'-azobis (2-amidinopropane) hydrochloride, a thermal, free-radical type initiator are added. The solution is deaerated by stirring and sparging with nitrogen for 30 minutes and then is heated to 60° C. Polymerization occurs over a 3 hour period, with considerable exotherm, in the case of formulations with a high proportion of acrylamide. The products are pourable solution containing 15% polymer by weight, the viscosity depending upon the quantity of chain transfer agent used. The following copolymers and terpolymers are made:

| Resin | Mole Ratio - AMD/Comonomer | Cationic Monomer | Chain Transfer Agent (ppm hypophosphite) | Viscosity of 1% Solution In 1 M NaCl | MW* (10⁻⁵) |
|---|---|---|---|---|---|
| A | 90/10 | Q-5 | 5,000 | 2.73 | 2.5 |
| B | 90/10 | Q-6 | 5,000 | 2.88 | 2.5 |
| C | 90/10 | Q-9 | 5,000 | 2.75 | 2.5 |
| D | 90/10 | Q-5 | 2,000 | 3.76 | 10 |
| E | 90/10 | Q-6 | 2,000 | 4.13 | 10 |
| F | 90/10 | Q-9 | 2,000 | 4.05 | 10 |
| G | 94/6 | Q-6 | 2,000 | 3.88 | 10 |
| H | 96/4 | Q-6 | 2,000 | 3.88 | 10 |
| I | 90/10 | Q-9 | 10,000 | 2.24 | 1.0 |
| J | 90/10 | Q-9 | 5,000 | 2.75 | 2.2 |
| K | 90/10 | Q-9 | 4,000 | 3.10 | 3.5 |
| L | 90/10 | Q-9 | 3,000 | 3.22 | 4.2 |
| M | 90/10 | Q-9 | 1,000 | 4.05 | 10.0 |
| N | 90/10 | Q-6 | 5,000 | | 2.5 |
| O | 87.5/12.5 | Q-6 | 5,000 | | 2.5 |
| P | 80/20 | Q-6 | 5,000 | | 2.5 |
| Q | 50/50 | Q-6 | 5,000 | | 2.5 |
| R | 100/0 | — | 5,000 | | 2.5 |

*Molecular weight estimated from polyacrylamides of equal solution solution viscosity.

PROCEDURES S-AA

The process employed for procedures A–R is employed to prepare several terpolymers for use in accordance with this invention:

| Resin | Composition (Mole %) | | |
|---|---|---|---|
| | AMD | CATIONIC(Q6) | NNDMA |
| S | 10 | 10 | 80 |
| T | 20 | 10 | 70 |
| U | 30 | 10 | 60 |
| V | 40 | 10 | 50 |
| W | 50 | 10 | 40 |
| X | 60 | 10 | 30 |
| Y | 70 | 10 | 20 |
| Z | 80 | 10 | 10 |
| AA | 90 | 10 | 0 |

EXAMPLES 23-26

Thirteen and three-tenths grams of a 15% polymer solution of the resin of Procedure B is weighed into a 200 ml glass jar and 18.67 g of distilled water is added to provide a 2% polymer solution i.e., 2.00 gms polymer in 100 gms total. The solution is stirred and concentrated sulfuric acid (98%) is added, 0.14-2.6 gms, until the pH of the solution reaches 1.5-1.7.

A solution of sodium hypochlorite is prepared separately by the passing of chlorine gas through a stirred, cooled solution of sodium hydroxide. The concentration is 7.4% NaOCl, as determined by titration of liberated iodine from potassium iodide with standard thiosulfate solution. The pH of the sodium hypochlorite solution is 9.5.

To portions of the 2% polymer solutions of the resin of Procedure B stirred at room temperature, different aliquots of sodium hypochlorite solution are added, slowly, during 15 seconds, ensuring that the pH remains below pH 2.0 at all times. The quantity of N-chlorinated comonomer produced by varying the amount of sodium hypochlorite is tabulated below:

| Example | Volume of 7.4% NaOCl Solution Added to 10 ml of 2% Polymer Solution, mls | Final pH | N—Chlorination of Acrylamide Comonomer |
|---|---|---|---|
| 23A* | 0 | 1.7 | 0 |
| 23 | 1.83 | 1.7 | 3.2 |
| 24 | 2.69 | 1.8 | 4.7 |
| 25 | 4.00 | 1.9 | 5.7 |
| 26 | 3.83 | 2.0 | 6.7 |

*Control

The N-chloro content of polymer is defined as: the weight of titratable chlorine ("active" chlorine) reacted with 100 gms of the original backbone polymer.

EXAMPLE 27-32

The polymer of Example 1 is dissolved in water to make a 2% aqueous solution and the solution is used in tub-sizing. Tub-sizing tests are carried out, first, at the natural pH of the solution of 6.0. The same solution, after standing at 23° C. for 2 days, is also used in the tub-sizing test. After the paper sheet is tub-sized in the solution and dried on a blotting paper, the % pick-up of the polymer solution is calculated. The sheet is dried on a drum drier for 1 minute at 116° C. The sheet is also given an additional cure of 5 minutes at 105° C. Permanent tensile is measured after 16 hours of water soak. An alkali resistance test is carried out on the treated sheet by using a standard 30 second soak in 1% commercially available alkaline cleaner solution. Tensile strength in (lb/in) is normalized to a basis weight of 50 lb. per 25"×40"/500 ream. The results are set forth, in the following table:

EXAMPLES 28-39

A bleached Kraft pulp beaten to a Canadian Freeness of 510 is diluted to 0.6% dry fiber content, the aqueous phase containing 50 ppm of calcium ions and 200 ppm sulfate at pH 7.0. Ten grams of fiber, in 1667 gms total suspension, is stirred at 300 revolutions per minute and varying quantities of the N-chlorinated solution polymers of Examples 23A*-26 are added, so as to give constant amount of resin based on the fibers, specifically, 0.75% of fiber weight, dry basis. The stirring is continued for one minute after the polymer addition maintaining the pH at 6.0, 7.0 or 8.0 by addition of a few drops of N/10 NaOH, as needed. Then three sheets are made from the 10 g batch of fiber, 2.8 gms of fiber per sheet. The sheets are pressed to remove excess water and dried for 30 seconds at 240° F. After storage at 73° F./50% relative humidity for 16 hours, the sheets are tested for basis weight and immediate wet tensile strength. Tensile strengths are corrected to a basis weight of 70 gms/sq. meter. The results are as follows:

| Example | % Active Chlorine | pH of Handsheet Tests | Immediate Wet Tensile lb/in |
|---|---|---|---|
| 28A* | 0 | 6.0 | 0.38 |
| 28 | 3.2 | 6.0 | 2.8 |
| 29 | 4.7 | 6.0 | 3.1 |
| 30 | 5.7 | 6.0 | 3.6 |
| 31 | 6.7 | 6.0 | 3.6 |
| 32A* | 0 | 7.0 | 0.40 |
| 32 | 3.2 | 7.0 | 3.8 |
| 33 | 4.7 | 7.0 | 4.3 |
| 34 | 5.7 | 7.0 | 4.4 |
| 35 | 6.7 | 7.0 | 4.6 |
| 36A | 0 | 8.0 | 0.50 |
| 36 | 3.2 | 8.0 | 4.4 |
| 37 | 4.7 | 8.0 | 4.5 |
| 38 | 5.7 | 8.0 | 3.6 |
| 39 | 6.7 | 8.0 | 3.5 |

The results indicate beneficial enhancement of tensile strength.

EXAMPLES 40-46

| RUN Example | Polymer Solution pH | % Polymer Contained in Sheet | TENSILE STRENGTH (lb/in) | | | | | |
|---|---|---|---|---|---|---|---|---|
| | | | Off-machine Cure (1 min. @ 240° F.) | | | | Post Cure (5 min, 105° C.) | |
| | | | Wet | | | | Wet | |
| | | | Immediate | Permanent | Alkaline | Dry | Immediate | Permanent |
| 27A* | 7 | | 1 | 1 | 1 | — | 1 | 1 |
| 27 | 3.05 | 1.85 | 3.34 | 3.63 | 3.29 | 20.55 | 3.75 | 4.05 |
| 28 | 6.0 | 1.73 | 5.89 | 6.01 | 5.57 | 30.54 | 6.73 | 5.75 |
| 29B | 4.2 | 1.78 | 5.44 | 4.63 | 4.71 | 27.12 | 5.73 | 5.03 |
| 30 | 3.4 | 1.78 | 4.32 | 3.96 | 4.14 | 21.99 | 4.30 | 3.70 |
| 31 | 6.0 | 1.77 | 4.16 | 3.96 | 3.79 | 18.25 | 3.99 | 3.94 |
| 32 | 7.0 | 1.72 | 4.94 | 3.89 | 4.29 | 21.83 | 5.12 | 4.64 |

*Control
ATub-sized on 2% aqueous solution. Solution tested immediately after pH adjustment
BThe solution was used after standing at 23° C. for 2 days after it was prepared The data show that the paper conditioned with the polymer chlorinated in accordance with this invention exhibits excellent alkali resistance, permanence and cure response.

Following the general procedure of Examples 28-39, paper is made and the wet strength tested after using copolymers prepared by the addition of acid/NaOCl in accordance with this invention. The following results were obtained:

| Example | Resin Procedure | Mole Ratio AMD/Comonomer | Mol Wt. $(10^{-5})$ | % Active Cl in Polymer | Immediate Wet Tensile Strength (lb/in) |
|---|---|---|---|---|---|
| 40 | A | 90 10 Q-5 | 2.1 | 4.5 | 3.3 |
| 41 | B | 90 10 Q-6 | 2.7 | 4.5 | 3.5 |
| 42 | I | 90 10 Q-9 | 1.0 | 4.5 | 2.4 |
| 43 | C | 90 10 Q-9 | 2.2 | 4.5 | 2.7 |
| 44 | K | 90 10 Q-9 | 3.5 | 4.5 | 2.6 |
| 45 | M | 90 10 Q-9 | 4.2 | 4.5 | 2.5 |
| 46 | M | 90 10 Q-9 | 10.2 | 4.5 | 3.1 |

EXAMPLES 47-53

The general procedure of Examples 28-39 is repeated but the polymer level is lowered to 0.50% based on the dry weight of fiber and the terpolymers, of Procedures W-Z are tested. The following results are obtained:

| Example | Resin | Composition Moles AMD | Q-6 | NNDMA | Mol. Wt. $(10^{-5})$ | % Active Cl In Polymer | Wet Tensile (lb/in) |
|---|---|---|---|---|---|---|---|
| 47 | Z | 80 | 10 | 10 | 5 | 6.5 | 3.3 |
| 48 | Y | 70 | 10 | 20 | 5 | 6.5 | 2.9 |
| 49 | X | 60 | 10 | 30 | 5 | 6.5 | 2.8 |
| 50 | W | 50 | 10 | 40 | 5 | 6.5 | 2.4 |
| 51 | W | 50 | 10 | 40 | 5 | 3.2 | 2.1 |
| 52 | W | 50 | 10 | 40 | 5 | 8.2 | 2.4 |
| 53 | W | 50 | 10 | 40 | 5 | 10.5 | 1.9 |

The foregoing patents and publications and test methods are incorporated herein by reference.

Many variations will suggest themselves to those skilled in this art in light of the foregoing description. For example, instead of the copolymers prepared by Procedures A-C, I, K, M and W-Z, those prepared by the chlorinating the resins of Procedures D-H, J. L, N-V and AA can be substituted to make paper with improved wet strength. All such obvious variations are within the full intended scope of the appended claims.

We claim:

1. A process for the halogenation of a water soluble acrylamide polymer, said process comprising contacting solution of said polymer of a molecular weight of at least about 100,00, with a reagent selected from a halogen gas or a hypohalite at a temperature ranging from about $-10°$ C. to about 80° C., at a pH of below about 6.0, and at a mole ratio of halogen gas or hypohalite to polymer ranging from about 0.1:99.9 to about 50:50, respectively, to thereby form the corresponding water-soluble, N-halogenated polymer.

2. A process as defined in claim 1 wherein the pH is below about 3.5.

3. A process as defined in claim 2 wherein the pH is below about 2.0.

4. A process as defined in claim 1 wherein said water-soluble N-halogenated polymer comprises recurring units of the formula:

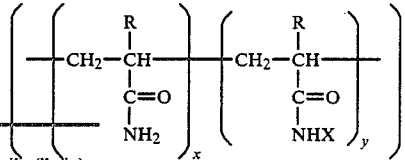

wherein R is hydrogen or methyl, X is a halogen atom and the ratio of x to y ranges from about 99.9:0.1 to about 50:50, respectively.

5. A process according to claim 4 wherein R is hydrogen.

6. A process according to claim 4 wherein X is chlorine.

7. A process according to claim 4 wherein up to about 20% of the polymer, by weight, comprising component x is replaced by a non-ionic copolymerizable monomer.

8. A process as defined in claim 1 wherein said water-soluble N-halogenated polymer comprises recurring units of the formula:

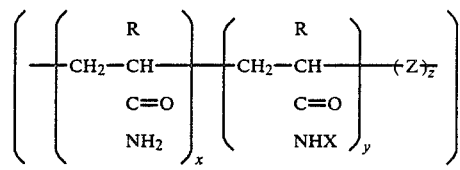

wherein R is hydrogen or methyl, X is a halogen atom, the ratio of x to y ranges from about 99.9:0.1 to about 50:50, respectively, the ratio of (x plus y) to z ranges from about 99.9 to 0.1 to about 50:50, respectively, and Z is the residue of a copolymerized cationic monomer.

9. A process according to claim 8 wherein R is hydrogen.

10. A process according to claim 8 wherein X is chlorine.

11. A process according to claim 8 wherein Z is diallyldimethylammonium chloride polymerization residue, methacrylamidopropyl trimethyl ammonium chloride polymerization residue, dimethylaminoethyl methacrylate methosulfate polymerization residue, dimethylaminoethyl acrylate quaternary ammonium chloride polymerization residue, sodium acrylate polymerization residue, acrylic acid polymerization residue or a mixture of any of the foregoing polymerization residues.

* * * * *